United States Patent
Kang et al.

(10) Patent No.: US 10,062,516 B2
(45) Date of Patent: Aug. 28, 2018

(54) THIN-FILM CERAMIC CAPACITOR

(71) Applicant: SAMSUNG ELECTRO-MECHANICS CO., LTD., Suwon-si, Gyeonggi-do (KR)

(72) Inventors: Yun Sung Kang, Suwon-si (KR); Hai Joon Lee, Suwon-si (KR); Tae Joon Park, Suwon-si (KR); Dong Joon Oh, Suwon-si (KR); Yun Hee Kim, Suwon-si (KR); Kyo Yeol Lee, Suwon-si (KR); Seung Mo Lim, Suwon-si (KR); In Young Kang, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/634,327

(22) Filed: Jun. 27, 2017

(65) Prior Publication Data

US 2018/0144871 A1 May 24, 2018

(30) Foreign Application Priority Data

Nov. 23, 2016 (KR) .................. 10-2016-0156660

(51) Int. Cl.
*H01G 4/33* (2006.01)
*H01G 4/12* (2006.01)
*H01G 4/005* (2006.01)

(52) U.S. Cl.
CPC ............ *H01G 4/33* (2013.01); *H01G 4/005* (2013.01); *H01G 4/1227* (2013.01)

(58) Field of Classification Search
None
See application file for complete search history.

(56) References Cited

U.S. PATENT DOCUMENTS

| | | | | | |
|---|---|---|---|---|---|
| 4,377,840 A | * | 3/1983 | Nair | .................... | H01G 4/1227 361/320 |
| 5,978,207 A | * | 11/1999 | Anderson | ............. | C23C 14/088 257/E21.009 |
| 6,069,817 A | * | 5/2000 | Shin | ........................ | G11C 11/22 365/145 |
| 6,340,621 B1 | * | 1/2002 | Anderson | ............. | C23C 14/088 257/E21.272 |
| 2016/0016813 A1 | * | 1/2016 | Shimoda | .................. | H01G 4/33 252/518.1 |

(Continued)

FOREIGN PATENT DOCUMENTS

| JP | 2015-070058 A | 4/2015 |
|---|---|---|
| KR | 10-0252052 B1 | 4/2000 |
| KR | 10-1013762 B1 | 2/2011 |

*Primary Examiner* — Dion R Ferguson
(74) *Attorney, Agent, or Firm* — McDermott Will & Emery LLP

(57) ABSTRACT

A thin-film ceramic capacitor includes: a body in which a plurality of dielectric layers and first and second electrode layers are alternately disposed on a substrate; and first and second electrode pads disposed on an external surface of the body. The dielectric layer contains a mixed phase of a perovskite phase having ferroelectric properties and a pyrochlore phase having paraelectric properties, the pyrochlore phase being disposed on interfaces between the dielectric layers and the first and second electrode layers in lower portions of the dielectric layers.

12 Claims, 9 Drawing Sheets

A

(56) References Cited

U.S. PATENT DOCUMENTS

2016/0172107 A1* 6/2016 Yoon .................. C04B 35/4682
                                                    361/301.4
2016/0268048 A1* 9/2016 Zelner .................... H01G 4/012
2017/0365656 A1* 12/2017 Zelner .................... H01L 28/40
2018/0068798 A1* 3/2018 Lee ......................... H01G 4/33

* cited by examiner

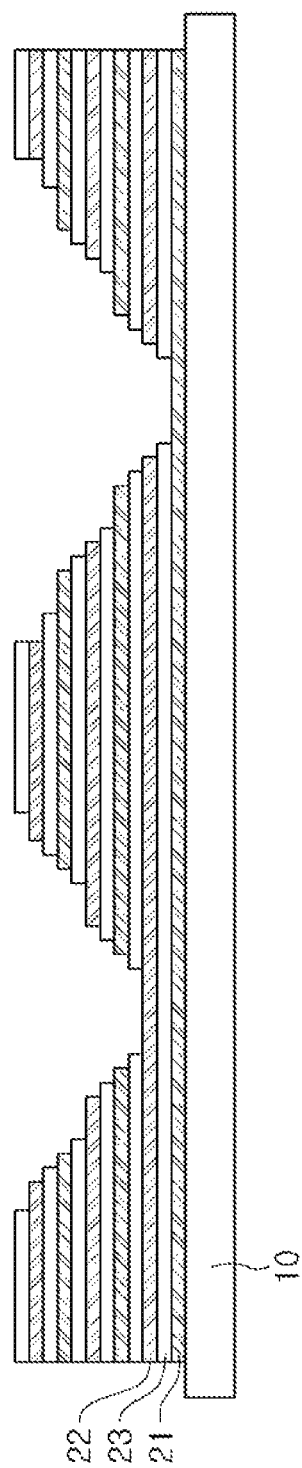

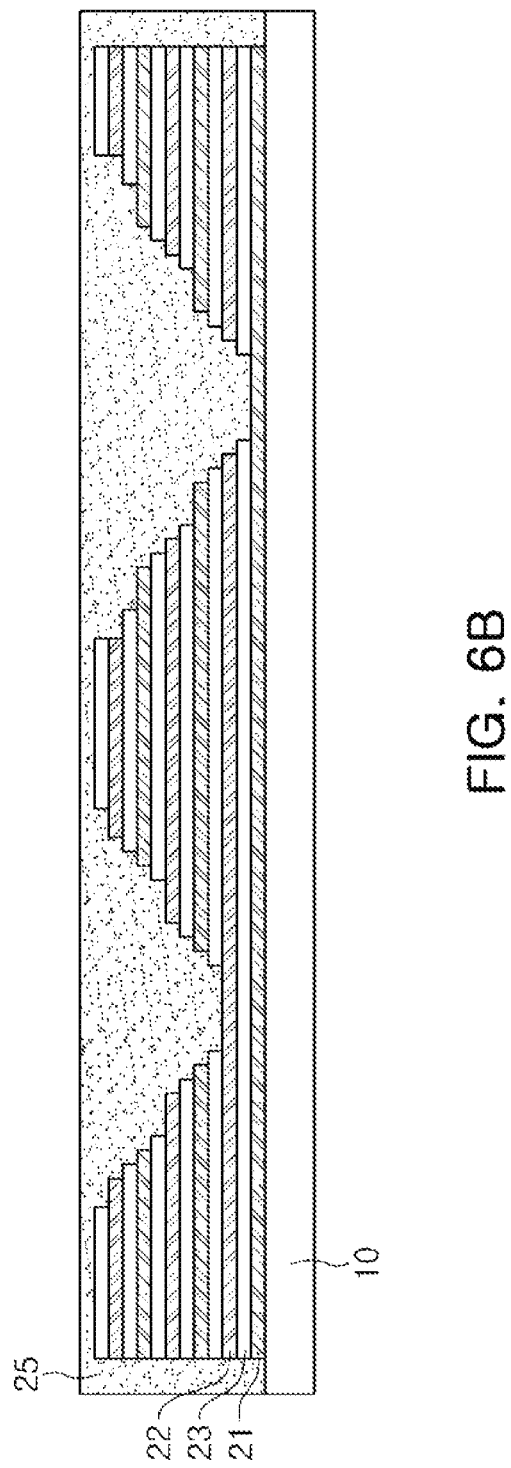

US 10,062,516 B2

THIN-FILM CERAMIC CAPACITOR

CROSS-REFERENCE TO RELATED APPLICATION(S)

This application claims benefit of priority to Korean Patent Application No. 10-2016-0156660 filed on Nov. 23, 2016 in the Korean Intellectual Property Office, the disclosure of which is incorporated herein by reference in its entirety.

TECHNICAL FIELD

The present disclosure relates to a thin-film ceramic capacitor.

BACKGROUND

Recently, portable information technology (IT) products such as smartphones, wearable devices, and the like, have been thinned. Therefore, the necessity of thinning a passive element in order to decrease an overall thickness of a package has increased.

To this end, demand for a thin-film ceramic capacitor capable of implementing a reduced thickness of a package, as compared to a multilayer ceramic capacitor, has also increased.

Meanwhile, in developing a capacitor, as research into a dielectric material has been conducted, $PbZrTiO_3$ (PZT)-based dielectric materials and $BaTiO_3$ (BT)-based dielectric materials have been spotlighted. The PZT-based and BT-based dielectric materials have high permittivity, a low dielectric loss, and excellent electrical properties.

However, in these PZT-based and BT-based dielectric materials, changes in dielectric properties depending on a temperature are large due to ferroelectricity, such that these PZT-based and BT-based dielectric materials have high temperature-dependency. As a result, electrical properties of a manufactured device may be changed depending on a use temperature, such that performance thereof may be changed depending on a temperature.

Due to this temperature instability problem, research into application of a paraelectric material capable of solving this problem has been conducted. However, since the paraelectric material such as $BaSrTiO_3$ (BST) has a relatively low dielectric constant as compared to the ferroelectric material, there is a limitation in manufacturing a high-capacitance capacitor.

Therefore, there is a need to develop a method of utilizing a ferroelectric material stable against a temperature change and has high permittivity as a material of a capacitor.

SUMMARY

An aspect of the present disclosure may provide a high-capacitance thin-film ceramic capacitor stable against a temperature change.

According to an aspect of the present disclosure, a thin-film ceramic capacitor may include: a body in which a plurality of dielectric layers and first and second electrode layers are alternately disposed on a substrate; and first and second electrode pads disposed on an external surface of the body. The dielectric layer contains a mixed phase of a perovskite phase having ferroelectric properties and a pyrochlore phase having paraelectric properties, the pyrochlore phase being disposed on interfaces between the dielectric layers and the first and second electrode layers in lower portions of the dielectric layers.

BRIEF DESCRIPTION OF DRAWINGS

The above and other aspects, features, and advantages of the present disclosure will be more clearly understood from the following detailed description taken in conjunction with the accompanying drawings, in which:

FIGS. 6A through 6D are views illustrating processes of manufacturing an insulating layer in the vias in the thin-film ceramic capacitor according to the exemplary embodiment in the present disclosure.

DETAILED DESCRIPTION

Hereinafter, exemplary embodiments of the present disclosure will now be described in detail with reference to the accompanying drawings.

Hereinafter, a thin-film ceramic capacitor according to the present disclosure will be described.

Figure 1:
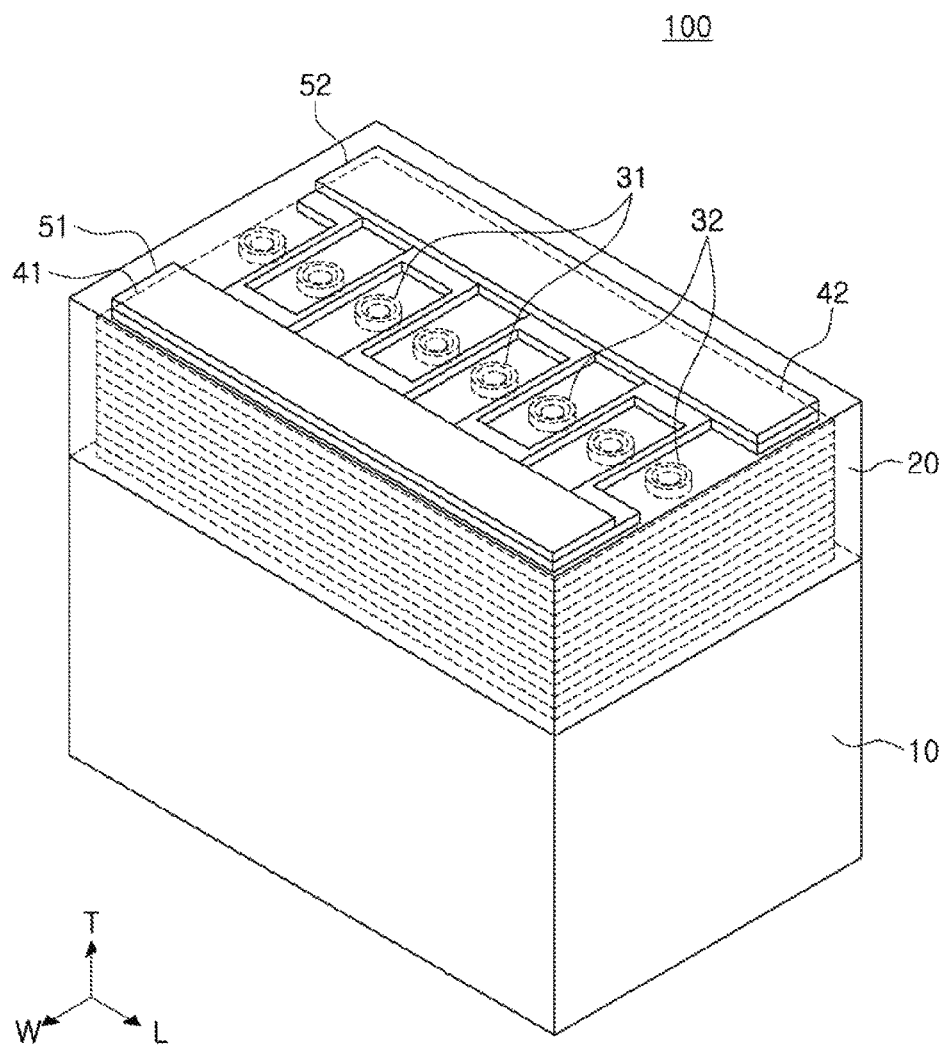
FIG. 1 is a schematic perspective view of a thin-film ceramic capacitor according to an exemplary embodiment in the present disclosure.
Figure 2:
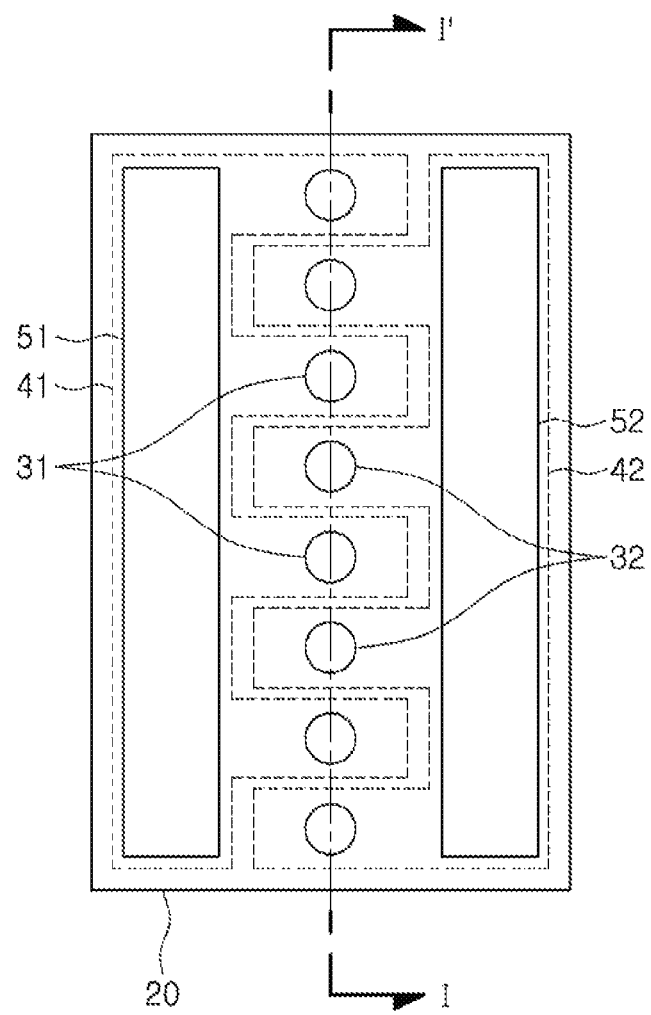
FIG. 2 is a plan view of the thin-film ceramic capacitor according to the exemplary embodiment in the present disclosure.

FIG. 1 is a schematic perspective view of a thin-film ceramic capacitor according to an exemplary embodiment in the present disclosure, and FIG. 2 is a plan view of the thin-film ceramic capacitor according to the exemplary embodiment in the present disclosure.

Figure 3:
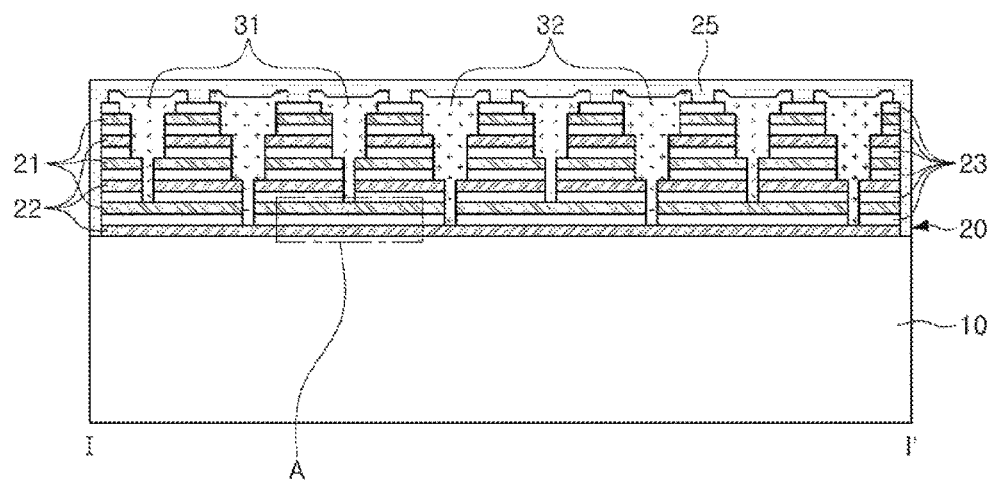
FIG. 3 is a schematic cross-sectional view taken along line I-I' of FIG. 2.

FIG. 3 is a schematic cross-sectional view taken along line I-I' of FIG. 1.

Referring to FIGS. 1 through 3, a thin-film ceramic capacitor 100 according to the exemplary embodiment in the present disclosure may include a body 20 formed by alternately stacking first and second electrode layers 21 and 22 with one of dielectric layers 23 interposed therebetween on a substrate 10; and a plurality of vias 31 and 32 disposed in the body 20. Among the plurality of vias, a first via 31 is electrically connected to the first electrode layer 21, and among the plurality of vias, a second via 32 is electrically connected to the second electrode layer 22.

Further, the thin-film ceramic capacitor 100 according to the exemplary embodiment in the present disclosure may include first and second electrode pads 51 and 52 disposed on an external surface of the body 20 not to overlap the first and second vias 31 and 32 in a stacking direction, respectively, a first connection electrode 41 disposed on the external surface of the body 20 and connecting the first electrode pad 51 and the first via 31 to each other, and a second connection electrode 42 disposed on the external surface of the body 20 and connecting the second electrode pad 52 and the second via 32 to each other.

Therefore, among the plurality of vias, the first via 31 may connect the first electrode layer 21 and the first electrode pad 51 to each other, and among the plurality of vias, the second via 32 may connect the second electrode layer 22 and the second electrode pad 52 to each other.

According to the exemplary embodiment in the present disclosure, a 'length direction' of the thin-film ceramic capacitor refers to an 'L' direction of FIG. 1, a 'width direction' thereof refers to a 'W' direction of FIG. 1, and a 'thickness direction' thereof refers to a 'T' direction of FIG. 1. The 'thickness direction' is the same as a direction in which dielectric layers and the electrode layers are stacked, that is, the 'stacking direction'.

A shape of the body 20 is not particularly limited, but generally, may be a hexahedral shape. Further, the body 20 is not particularly limited in view of a dimension, but may have, for example, a size of 0.6 mm×0.3 mm and may be a highly stacked and high-capacitance thin-film ceramic capacitor of 1.0 µF or more.

The substrate 10 may be a layer (substrate) contacting the first and second electrode layers 21 and 22 and having an insulation property, and be formed of one selected from $Al_2O_3$, $SiO_2/Si$, MgO, $LaAlO_3$, and $SrTiO_3$, but is not limited thereto. It is preferable that the substrate 10 has sufficient flatness and suitable surface roughness.

In the body 20 having a stacking structure in which the second electrode layer 22 is formed on the substrate 10, the dielectric layer 23 is formed on the second electrode layer 22, and the first electrode layer 21 is formed on the dielectric layer 23, the plurality of first and second electrode layers 21 and 22 may be alternately stacked with one of the dielectric layers 23 interposed therebetween. Here, the numbers of stacked dielectric layers and first and second electrode layers are not limited to those in the accompanying drawing.

The body 20 may be formed by stacking the dielectric layers 23 and the first and second electrode layers 21 and 22 to be alternately disposed on the substrate 10.

In more detail, the body 20 may be formed by stacking the plurality of dielectric layers 23 in the thickness direction and stacking the first and second electrode layers 21 and 22 simultaneously in a vacuum state so as to be alternately disposed with one of the dielectric layers 23 interposed therebetween.

According to the exemplary embodiment in the present disclosure, the plurality of vias may have a stepped shape by performing interlayer etching while changing an etching area in order to selectively connect internal electrodes of the thin-film ceramic capacitor stacked simultaneously in the vacuum state.

Further, etching surfaces of the dielectric layers 23 and the first and second electrode layers 21 and 22 may be exposed to the plurality of vias, and electrical connection may be blocked by forming an insulating layer on an electrode layer requiring insulation among the exposed first and second electrode layers.

Next, after exposing only an electrode to be connected, a seed layer is formed using an electroless plating method or a sputtering method, and then, an electrode connection layer may be formed by filling a conductive metal using a plating method.

Therefore, interlayer electrical connection of the internal electrodes may be implemented by one via.

According to the exemplary embodiment in the present disclosure, since the thin-film ceramic capacitor is manufactured by stacking the dielectric layers 23 and the first and second electrode layers 21 and 22 simultaneously in the vacuum state, a damage occurring at the time of exposure to an external environment may be significantly decreased.

As the numbers of stacked first and second electrode layers 21 and 22 and dielectric layers 23 are increased, equivalent series resistance (ESR) of the capacitor may be decreased.

Each of the first and second electrode layers 21 and 22 may be formed as a single layer without a predetermined pattern.

The first and second electrode layers 21 and 22 may be formed of a conductive material.

The conductive material may be nickel (Ni), molybdenum (Mo), gold (Au), silver (Ag), platinum (Pt), iridium (Ir), ruthenium (Ru), or the like, but is not limited thereto.

Formation of the dielectric layer corresponding to a thin film having high permittivity may be accompanied by high-temperature thermal history. Therefore, a problem in which a leakage current is increased in the capacitor may occur due to diffusion of the electrode layer to the dielectric layer or a reaction between the electrode layer and the dielectric layer.

The first and second electrode layers 21 and 22 may be formed of platinum (Pt), a material having a high melting point, such that diffusion to the dielectric layer or the reaction with the dielectric layer may be decreased.

The first via 31 may be electrically connected to the first electrode layer 21, the second via 32 may be electrically connected to the second electrode layer 22, and the first and second vias 31 and 32 may be electrically insulated from each other.

The first and second vias 31 and 32 may be formed of a conductive material, and be formed by a plating method. Therefore, recess portions (dimples) may be formed in upper surfaces of the first and second vias.

The conductive material may be copper (Cu), aluminum (Al), gold (Au), silver (Ag), platinum (Pt), or the like, but is not limited thereto.

The first and second vias 31 and 32 may be formed in plural. When the first and second vias are formed in plural, contact surfaces of the first and second vias contacting the first and second electrode layers, respectively, may be increased, such that equivalent series resistance (ESR) of the capacitor may be decreased.

The first and second connection electrodes 41 and 42 may be formed to connect the first and second vias 31 and 32 to the first and second electrode pads 51 and 52 to each other, respectively.

The first and second connection electrodes 41 and 42 may be formed of a conductive material, and may be formed using a plating method.

The conductive material may be copper (Cu), aluminum (Al), gold (Au), silver (Ag), platinum (Pt), or the like, but is not limited thereto.

The first and second electrode pads 51 and 52 may be formed on an upper surface of the body 20, and connected to the first and second electrode layers 21 and 22 through the plurality of vias 31 and 32 exposed to one surface of the body 20 to thereby be electrically connected thereto.

The first and second electrode pads 51 and 52 as described above may be formed on the upper surface of the body 20 by a thin film formation method such as a sputtering method or an e-beam deposition method.

The first and second electrode pads 51 and 52 may contain a conductive material.

The conductive material contained in the first and second electrode pads 51 and 52 may be copper (Cu), aluminum (Al), gold (Au), silver (Ag), platinum (Pt), or the like, but is not limited thereto.

The first and second electrode pads 51 and 52 may include seed layers and electrode layers formed from the seed layers, respectively.

The first and second electrode pads 51 and 52 may be disposed not to overlap the first and second vias, respectively, in the stacking direction of the dielectric layers and the electrode layers.

The first and second electrode pads 51 and 52 may be integrated with the first and second connection electrodes, respectively. Alternatively, the first and second electrode pads 51 and 52 may be disposed on the first and second connection electrodes 41 and 42, respectively.

The first and second connection electrodes 41 and 42 may have a comb shape due to disposition of the first and second vias 31 and 32. The first and second connection electrodes having the comb shape may be alternately disposed to be engaged with each other.

In detail, the first connection electrode 41 may include a plurality of first connection portions connected to the plurality of first vias, respectively, and a first electrode portion connected to the plurality of first connection portions, and the second connection electrode 42 may include a plurality of second connection portions connected to the plurality of second vias, respectively, and a second electrode portion connected to the plurality of second connection portions.

Since the first and second connection electrodes also have different polarities from each other, the smaller the interval between the first and second connection electrodes, the more excellent the effect of decreasing equivalent series inductance (ESL).

The plurality of first and second connection portions may have shapes of branches extending from the plurality of first and second vias, respectively.

An insulating layer 27, which will be described with reference to FIG. 6C, may be formed in order to allow the first and second vias 31 and 32 to be electrically connected to the first and second electrode layers 21 and 22, respectively.

The insulating layer 27 may be formed between the first via 31 and the dielectric layer 23 and the second electrode layer 22, and between the second via 32 and the dielectric layer 23 and the first electrode layer 21.

That is, the insulating layer may secure insulation between the first via and the second electrode layer and insulation between the second via and the first electrode layer, and be formed on a surface of the dielectric layer, thereby decreasing parasitic capacitance formed therein.

The insulating layer 27 may use an organic material such as benzocyclobutene (BCB), polyimide, or the like, or an inorganic material such as $SiO_2$, $Si_3N_4$, or the like, and it is preferable that the insulating layer 27 is formed of a material having lower permittivity than that of the material of the dielectric layer in order to increase an insulation property and decrease parasitic capacitance.

The insulating layer may be formed by a chemical vapor deposition (CVD) method capable of forming a uniform film thickness on a complex three dimensional shape.

A protection layer 25 may be formed in order to prevent the body 20 and the first and second connection electrodes 41 and 42 from degradation or contamination of materials caused by humidity from the outside and a chemical reaction with oxygen, and damage at the time of mounting.

The protection layer 25 may be formed of a material having high thermal resistance. For example, the protection layer 25 may be formed of an organic thermosetting material or photocurable material such as polyimide.

An upper surface of the first electrode layer 21 in the first via 31 and an upper surface of the second electrode layer 22 in the second via 32 may be exposed to thereby be connected to the first and second electrode pads 51 and 52, respectively.

According to the exemplary embodiment in the present disclosure, widths of the plurality of vias 31 and 32 may be increased in a direction from the substrate 10 to an upper portion of the body 20.

The first and second vias 31 and 32 may be manufactured so that the widths thereof are increased in the direction from the substrate 10 to the upper portion of the body 20, such that the first via 31 may be connected to substantially all of the first electrode layers 21 disposed in the body 20, and the second via 32 may be connected to substantially all of the second electrode layers 22 disposed in the body 20. The description that the first via 31 is connected to substantially all of the first electrode layers 21 means that the first via 31 is electrically connected to all of the first electrode layers 21, or means that the first via 31 is intended to be electrically connected to all of the first electrode layers 21 but may be electrically insulated from one or more of the first electrode layers 21 among all of the first electrode layers 21 due to a process deviation or a process error/margin. The description that the second via 32 is connected to substantially all of the second electrode layers 22 means that the second via 32 is electrically connected to all of the second electrode layers 22, or means that the second via 32 is intended to be electrically connected to all of the second electrode layers 21 but may be electrically insulated from one or more of the second electrode layers 22 among all of the second electrode layers 22 due to a process deviation or a process error/margin.

Since the first via 31 is formed by performing the etching up to a layer to which the first electrode layer 21 is exposed, and the width thereof is increased in the direction from the substrate 10 to the upper portion of the body 20, after the insulating is performed, the insulating layer 27 may be disposed on etched surfaces of the dielectric layer 23 and the second electrode layer 22, and only a side surface of the first electrode layer 21 having an inclined surface shape may be exposed.

Therefore, substantially all of the first electrode layers 21 may be electrically connected to the first via 31, and electrically connected to the first electrode pad 51 through the first via 31.

Meanwhile, Since the second via 32 is formed by performing the etching up to a layer to which the second electrode layer 22 is exposed, and the width thereof is increased in the direction from the substrate 10 to the upper portion of the body 20, after the insulating is performed, the insulating layer 27 may be disposed on etched surfaces of the dielectric layer 23 and the first electrode layer 21, and only a side surface of the second electrode layer 22 having an inclined surface shape may be exposed.

Therefore, substantially all of the second electrode layers 22 may be electrically connected to the second via 32, and electrically connected to the second electrode pad 52 through the second via 32.

Further, the insulating layer 27 may be disposed on the second electrode layer 22 exposed in the first via 31 and the first electrode layer 21 exposed in the second via 32.

In detail, the insulating layer 27 may be disposed on etched surfaces of the second electrode layer 22 exposed in the first via 31 and the first electrode layer 21 exposed in the second via 32.

According to the exemplary embodiment in the present disclosure, since the first via 31 is connected to substantially all of the first electrode layers 21 and the second via 32 is connected to substantially all of the second electrode layers 22, even in a case in which one or two or more internal electrodes are not connected to the vias due to a process deviation, there is no problem in forming capacitance.

That is, in a structure in which one via is respectively connected to one internal electrode as in the related art, when the connection is failed, capacitance is not formed, and as a result, capacitance of a capacitor may be decreased.

However, according to the exemplary embodiment in the present disclosure, since the first via 31 is connected to substantially all of the first electrode layers 21 and the second via 32 is connected to substantially all of the second electrode layers 22, even though some of the internal electrodes are not connected to the vias, there is no problem in forming capacitance, such that reliability may be excellent.

The number of first vias 31 may be two or more, and the plurality of the first vias 31 may have the same depth as each other. In addition, the number of the second vias 32 may be two or more, and the plurality of the second vias 32 may have the same depth as each other.

Figure 4:
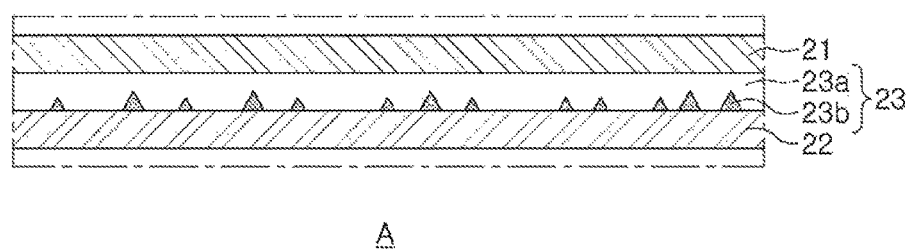
FIG. 4 is an enlarged view of part A of FIG. 3.

FIG. 4 is an enlarged view of part A of FIG. 3.

Referring to FIG. 4, in the thin-film ceramic capacitor according to the exemplary embodiment in the present disclosure, the dielectric layer 23 may contain a mixed phase of a perovskite phase 23a having ferroelectric properties and a pyrochlore phase 23b having paraelectric properties, and the pyrochlore phase 23b may be disposed on interfaces between the dielectric layer 23 and the first and second electrode layers 21 and 22 in lower portions of the dielectric layers 23.

According to the exemplary embodiment in the present disclosure, the dielectric layer 23 may be formed by stacking a dielectric thin film containing the mixed phase of a phase having ferroelectric properties and a phase having paraelectric properties in order to implement a high-capacitance thin-film ceramic capacitor stable against a temperature change.

Here, the dielectric layer 23 may contain the mixed phase of the perovskite phase 23a having the ferroelectric properties and the pyrochlore phase 23b having the paraelectric properties by controlling volume fractions of the phase having the ferroelectric properties and the phase having the paraelectric properties.

The volume fractions of the phase having the ferroelectric properties and the phase having paraelectric properties may be controlled by a method of controlling interfaces of the first and second electrode layers 21 and 22 or a method of controlling deposition conditions at the time of depositing the dielectric thin-film.

More specifically, in the method of controlling the interfaces of the first and second electrode layers 21 and 22, at the time of initial deposition of the dielectric thin film, a predetermined level of the pyrochlore phase may be formed by adjusting the electrode layer to have an interface roughness of about 1 to 5 nm or thermally treating the electrode layer to modify the surface of the electrode layer.

As another method, in the method of controlling the deposition conditions at the time of depositing the dielectric thin film, a ratio of the perovskite phase 23a having the ferroelectric properties and the pyrochlore phase 23b having the paraelectric properties may be adjusted by depositing the dielectric thin film using a sputtering method, or the like, while adjusting a temperature and an amount of applied power among the deposition conditions.

Here, the dielectric layer 23 may further contain an additional ingredient in order to improve dielectric properties, wherein the additional ingredient may be a trivalent to pentavalent metal element and be contained in a concentration of 0.1 to 14 at %.

Through the control of the process conditions as described above, the dielectric layer 23 may contain the mixed phase of the perovskite phase 23a having the ferroelectric properties and the pyrochlore phase 23b having the paraelectric properties, and the pyrochlore phase 23b may be disposed on the interface between the dielectric layer 23 and the first and second electrode layers 21 and 22 in the lower portion of the dielectric layer 23.

Particularly, the pyrochlore phase 23b may be disposed on the interface between the dielectric layer 23 and the first and second electrode layers 21 and 22 in the lower portion of the dielectric layer 23, and have a triangular pyramid shape.

The pyrochlore phase 23b may grow inwardly from the interface between the dielectric layer 23 and the first and second electrode layers 21 and 22, and have the triangular pyramid shape.

Since the pyrochlore phase 23b grows inwardly from the interface between the dielectric layer 23 and the first and second electrode layers 21 and 22, the pyrochlore phase 23b may be formed on an interface of a lower electrode layer based on the dielectric layer 23.

According to the exemplary embodiment in the present disclosure, the volume fraction of the perovskite phase 23a having the ferroelectric properties may be 50 to 97 vol %, based on an overall volume of a single dielectric layer 23.

The high-capacitance thin-film ceramic capacitor stable against a temperature change may be implemented by adjusting the perovskite phase 23a having the ferroelectric properties to have a volume fraction of 50 to 97 vol %, based on the overall volume of the single dielectric layer 23.

In a case in which the volume fraction of the perovskite phase 23a having the ferroelectric properties in the dielectric layer 23 is less than 50 vol %, based on the overall volume of the single dielectric layer 23, the volume fraction of the pyrochlore phase 23b having the paraelectric properties may be increased, such that it is unlikely to implement the high-capacitance thin-film ceramic capacitor.

Meanwhile, in a case in which the volume fraction of the perovskite phase 23a having the ferroelectric properties, based on the overall volume of the single dielectric layer 23 is more than 97 vol %, since the ferroelectric properties are dominant, the capacitor may have different electrical properties depending on a use temperature, such that performance may be changed depending on the temperature.

The perovskite phase 23a having the ferroelectric properties may have a structure in which the perovskite phase is doped with niobium (Nb).

The dielectric layer 23 may contain the perovskite phase 23a having the ferroelectric properties, and the perovskite phase 23a having the ferroelectric properties may contain a perovskite material as a material having high permittivity.

The perovskite material may be a dielectric material of which permittivity may be significantly changed, for example, a barium titanate ($BaTiO_3$)-based material, a strontium titanate ($SrTiO_3$)-based material, a $(Ba,Sr)TiO_3$-based material, a lead zirconate titanate (PZT)-based material, or the like, but is not limited thereto.

Higher permittivity may be secure by doping niobium (Nb) on the perovskite phase 23a having the ferroelectric properties.

The pyrochlore phase may be $RE_2Ti_2O_7$, where RE is a rare earth element.

RE, the rare earth element, is not particularly limited, but may be, for example, at least one of Y, Dy, Ho, Er, Gd, Ce, Nd, Pm, Eu, Tb, Tm, Yb, Lu, or Sm.

A temperature coefficient of capacitance (TCC) of the mixed phase of the perovskite phase 23a having the ferroelectric properties and the pyrochlore phase 23b having the paraelectric properties may be within 20% in a temperature range from −55° C. to 125° C.

In a dielectric layer containing only a perovskite phase having general ferroelectric properties, a temperature coefficient of capacitance (TCC) may be in a range of −20 to +30% in a temperature range from −35° C. to 125° C., that is, the TCC may be changed by a total of 50% or more in the temperature range from −35° C. to 125° C., such that there is a problem in that a change depending on the temperature is large.

According to the exemplary embodiment, since the temperature coefficient of capacitance (TCC) of the mixed phase of the perovskite phase 23a, having the ferroelectric properties, and the pyrochlore phase 23b, having the paraelectric properties, may be within 20% in a temperature range from −55° C. to 125° C., the high-capacitance thin-film ceramic capacitor stable against a temperature change may be implemented.

Hereinafter, various Inventive Examples for manufacturing the thin-film ceramic capacitor according to the exemplary embodiment in the present disclosure will be described, but a method of manufacturing the thin-film ceramic capacitor is not limited thereto.

Figure 5A:
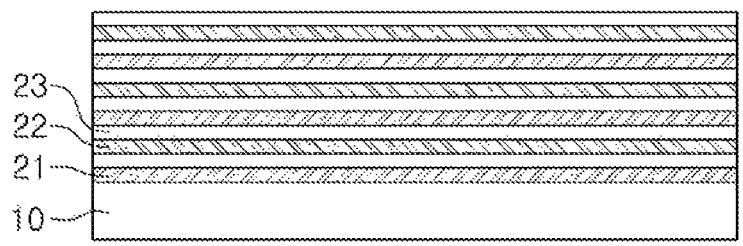
FIGS. 5A and 5B are views illustrating processes of manufacturing vias in the thin-film ceramic capacitor according to the exemplary embodiment in the present disclosure.
Figure 5B:
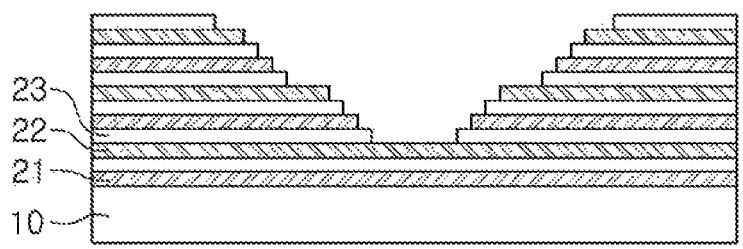

FIGS. 5A and 5B are views illustrating processes of manufacturing vias in the thin-film ceramic capacitor according to the exemplary embodiment in the present disclosure.

Hereinafter, a method of manufacturing vias in the thin-film ceramic capacitor will be described with reference to FIGS. 5A and 5B.

Referring to FIG. 5A, a laminate may be prepared by stacking the dielectric layers 23 and the first and second electrode layers 21 and 22 to be alternately disposed on the substrate 10.

The substrate 10 is not particularly limited. For example, the substrate may be formed of a prepreg.

According to the exemplary embodiment, the dielectric layer 23 in which the mixed phase of the perovskite phase 23a having the ferroelectric properties and the pyrochlore phase 23b having the paraelectric properties is formed may be formed by controlling the interface of the electrode layer and adjusting the deposition conditions while depositing a dielectric material, based on a $PbZrTiO_3$ (PZT)-based perovskite.

The first electrode layer 21 may be formed on the dielectric layer 23 by depositing a conductive metal using a thin-film formation method such as a sputtering method, an e-beam deposition method, or the like, and the dielectric layer 23 and the second electrode layer 22 may be formed thereon.

Here, the first electrode layer 21 may be formed on the substrate 10 prior to the dielectric layer 23 by depositing the conductive metal using the thin-film formation process such as the sputtering method, the e-beam deposition method, or the like. In this case, in order to secure adhesive force between the substrate and a conductive electrode, an adhesive layer formed of Ti, TiW, Cr, and the like, may be additionally inserted therebetween.

More specifically, in the method of controlling the interfaces of the first and second electrode layers 21 and 22, at the time of initial deposition of the dielectric thin film, a predetermined level of the pyrochlore phase may be formed by adjusting the electrode layer to have an interface roughness of about 1 to 5 nm or thermally treating the electrode layer to modify the surface of the electrode layer.

A method of thermally treating the electrode layer may be performed at 150 to 400° C. under an air, nitrogen (N2), or argon atmosphere. Here, conditions such as the temperature, and the like, may be adjusted.

As another method, in the method of controlling the deposition conditions at the time of depositing the dielectric thin film, a ratio of the perovskite phase 23a having the ferroelectric properties and the pyrochlore phase 23b having the paraelectric properties may be adjusted by depositing dielectric thin film using a sputtering method, or the like, while adjusting a temperature and an amount of applied power among the deposition conditions.

Among the deposition conditions, the temperature may be in a range of 350 to 550° C., and the amount of the applied power may be in a range of 2 to 5 $W/cm^2$. The ratio of the perovskite phase 23a and the pyrochlore phase 23b may be adjusted by adjusting the temperature and the amount of applied power as described above.

In this case, in order to improve the dielectric properties of the dielectric layer 23, the dielectric layer 23 may further contain an additional ingredient. The additional ingredient may be a trivalent to a pentavalent metal element such as La, Ca, Mn, Nb, Sr, Fe, Co, or the like, and be contained in a concentration of 0.1 to 14 at %.

Through the control of the process conditions as described above, the dielectric layer 23 may contain the mixed phase of the perovskite phase 23a having the ferroelectric properties and the pyrochlore phase 23b having the paraelectric properties, and the pyrochlore phase 23b may be disposed on the interface between the dielectric layer 23 and the first and second electrode layers 21 and 22 in the lower portion of the dielectric layer 23.

Particularly, the pyrochlore phase 23b may be disposed on the interface between the dielectric layer 23 and the first and second electrode layers 21 and 22 in the lower portion of the dielectric layer 23, and have a triangular pyramid shape.

The pyrochlore phase 23b may grow inwardly from the interface between the dielectric layer 23 and the first and second electrode layers 21 and 22, and have the triangular pyramid shape.

Since the pyrochlore phase 23b grows inwardly from the interface between the dielectric layer 23 and the first and second electrode layers 21 and 22, the pyrochlore phase 23b may be formed on an interface of a lower electrode layer, based on the dielectric layer 23.

According to the exemplary embodiment in the present disclosure, the volume fraction of the perovskite phase 23a having the ferroelectric properties may be 50 to 97 vol %, based on an entire volume of a single dielectric layer 23.

The high-capacitance thin-film ceramic capacitor stable against a temperature change may be implemented by adjusting the perovskite phase 23a having the ferroelectric properties to have a volume fraction of 50 to 97 vol %.

Therefore, the plurality of first and second electrode layers 21 and 22 may be formed to be alternately stacked through both end surfaces of the dielectric layers 23 opposing each other.

The stacking of the dielectric layers 23 and the first and second electrode layers 21 and 22 may be performed by a deposition method, but is not limited thereto. That is, the stacking may also be performed by a chemical solution deposition method.

The dielectric layers 23 and the first and second electrode layers 21 and 22 may be stacked simultaneously in a vacuum state without a separate patterning process.

Referring to FIG. 5B, in order to expose interlayer electrodes disposed in the laminate, a photoresist (not illustrated) may be applied on an upper surface of the laminate, and the photoresist may be patterned by an exposure and development method.

Next, vias may be formed by performing the etching up to a predetermined electrode layer.

The etching as described above may be performed up to a predetermined electrode layer simultaneously or plural times, such that a plurality of vias may be formed as illustrated in FIG. 6B, but a width of each of the via may be increased in a direction upward from the substrate and a shape thereof may be a stepped shape.

FIGS. 6A through 6D are views illustrating processes of manufacturing an insulating layer in vias in a thin-film ceramic capacitor according to another exemplary embodiment in the present disclosure.

FIGS. 6A to 6D illustrate a method of patterning the insulating layer in order to selectively connect exposed electrodes to each other.

That is, a first via needs to be connected to a first electrode layer and to be simultaneously insulated from an exposed second electrode layer, and a second via needs to be connected to a second electrode layer and to be simultaneously insulated from an exposed first electrode layer.

Therefore, there is a need to block electrical connection of the second electrode layer in the first via and block electrical connection of the first electrode layer in the second via using a dielectric layer or insulating layer.

FIG. 6A illustrates a cross section of a laminate in which first and second vias are formed through the processes of FIGS. 5A and 5B.

The first via may penetrate from one surface of the laminate to a lowermost first electrode layer adjacent to a substrate 10, and the second via may penetrate from one surface of the laminate to a lowermost second electrode layer adjacent to the substrate 10.

According to the exemplary embodiment, widths of the first and second vias may be increased in a direction from the substrate 10 to an upper portion of the laminate.

The first via may be connected to substantially all of the first electrode layers and the second via may be connected to substantially all of the second electrode layers by forming the first and second vias so that the widths thereof are increased in the direction from the substrate 10 to the upper portion of the laminate.

Referring to FIG. 6B, after the plurality of vias are formed in the laminate, an insulating material may be applied on the substrate 10.

Figure 6C:
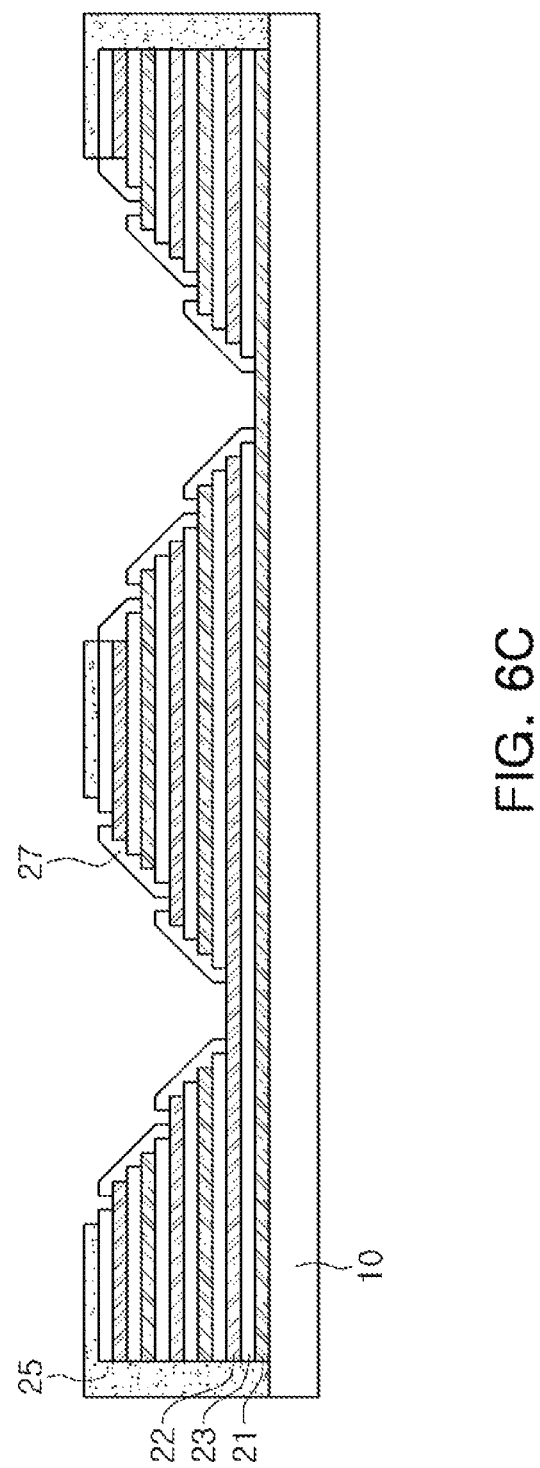

Referring to FIG. 6C, an insulating layer 27 may be formed on etched surfaces of the dielectric layers 23 and the first and second electrode layers 21 and 22 in the plurality of vias 31 and 32 by etching the insulating material.

Since the width of the first via 31 is increased in the direction from the substrate 10 to the upper portion of the laminate, after the insulating is completed, the insulating layer 27 may be disposed on the etched surfaces of the dielectric layer 23 and the second electrode layer 22, and only an upper surface of the first electrode layer 21 may be exposed.

In addition, since the width of the second via 32 is increased in the direction from the substrate 10 to the upper portion of the laminate, after the insulating is completed, the insulating layer 27 may be disposed on the etched surfaces of the dielectric layer 23 and the first electrode layer 21, and only an upper surface of the second electrode layer 22 may be exposed.

According to the exemplary embodiment in the present disclosure, any one of the first vias 31 may be connected to substantially all of the first electrode layers 21 disposed in the laminate, and any one of the second vias 32 may be connected to substantially all of the second electrode layers 22 disposed in the laminate.

The number of first via 31 units may be two or more, and among the plurality of first via 31 units, vias having the same shape may have the same depth as each other. In addition, the number of second via 32 units may also be two or more, and among the plurality of the second via 32 units, vias having the same shape may have the same depth as each other.

Figure 6D:
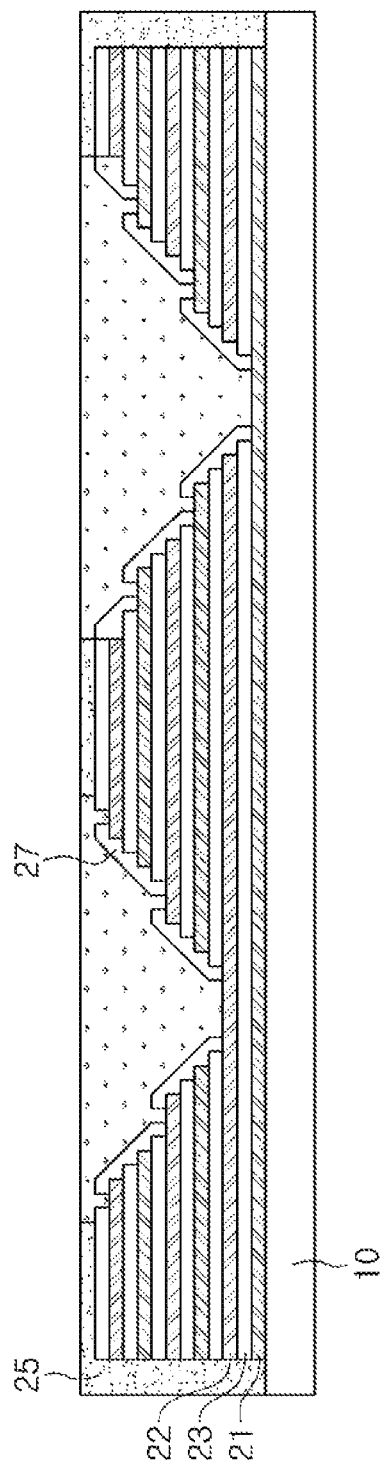

Referring to FIG. 6D, a conductive metal may be filled in the first and second vias 31 and 32.

A method of filling the conductive metal in the first and second vias 31 and 32 may be performed by forming a seed layer on a surface of each of the exposed electrode layers and filling the conductive metal by a plating method so as to connect the electrode layers and external electrodes to each other.

Figure 7:
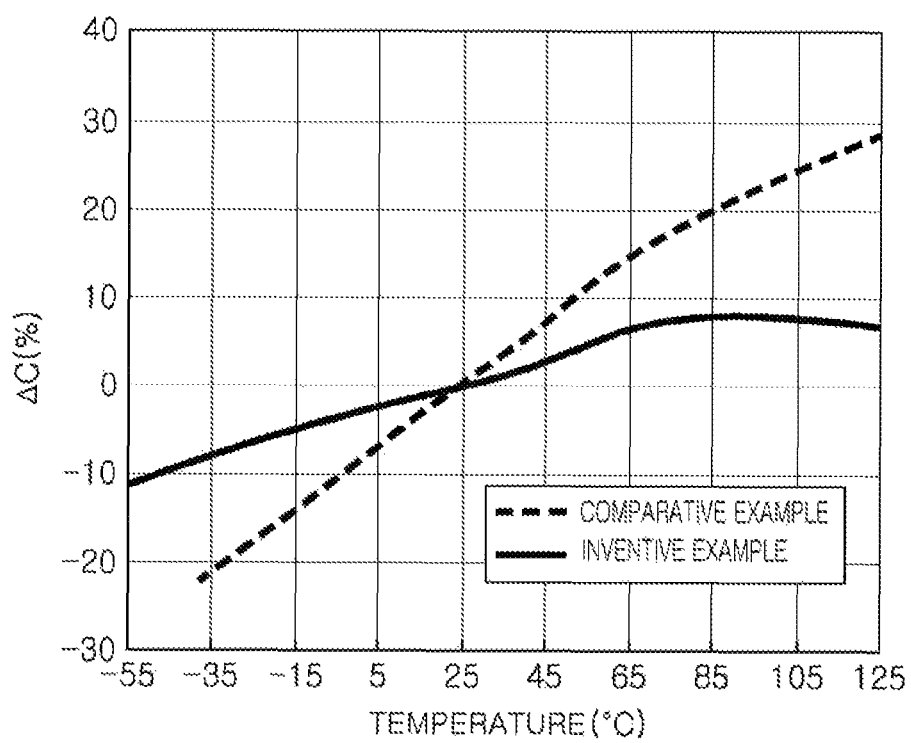
FIG. 7 is a graph comparing temperature coefficients of capacitance (TCC) of thin-film ceramic capacitors in the Inventive Example according to the present disclosure and the Comparative Example.

FIG. 7 is a graph comparing temperature coefficients of capacitance (TCC) of thin-film ceramic capacitors in Inventive Example according to the present disclosure and Comparative Example.

Referring to FIG. 7, in Inventive Example according to the exemplary embodiment in the present disclosure, since a dielectric layer contained the mixed phase of the perovskite phase 23a having the ferroelectric properties and the pyrochlore phase 23b having the paraelectric properties, the temperature coefficient of capacitance (TCC) may be within 20% in a temperature range from −55° C. to 125° C.

In Comparative Example in which a dielectric layer contains only a perovskite phase having general ferroelectric properties, a temperature coefficient of capacitance (TCC) was in a range of −20 to +30% in a temperature range from −35° C. to 125° C., that is, the TCC was changed by a total of 50% or more in the temperature range from −35° C. to 125° C., such that there was a problem in that a change depending on the temperature was large.

Referring to FIG. 7, it may be appreciated that since the temperature coefficient of capacitance (TCC) of the mixed phase of the perovskite phase 23a having the ferroelectric properties and the pyrochlore phase 23b having the paraelectric properties was within 20% in a temperature range from −55° C. to 125° C., the thin-film ceramic capacitor according to the present disclosure may be stable against a temperature change and implement high capacitance.

As set forth above, according to exemplary embodiments in the present disclosure, the high-capacitance thin-film ceramic capacitor stable against to the temperature change may be implemented by allowing the dielectric layer to contain the mixed phase of the phase having the ferroelectric properties and the phase having the paraelectric properties and controlling the volume fractions of the phase having the ferroelectric properties and the phase having the paraelectric properties.

Further, after the dielectric layers and electrodes may be stacked simultaneously, the electrodes may be electrically connected to each other by the via having a multistep shape, such that damages caused by external environments at the time of depositing the thin film may be significantly decreased, and a small-sized product having a thinner thickness may be implemented.

While exemplary embodiments have been shown and described above, it will be apparent to those skilled in the art that modifications and variations could be made without departing from the scope of the present invention as defined by the appended claims.

What is claimed is:

1. A thin-film ceramic capacitor comprising:
a body in which a plurality of dielectric layers and first and second electrode layers are alternately disposed on a substrate; and
first and second electrode pads disposed on an external surface of the body,
wherein the dielectric layer contains a mixed phase of a perovskite phase having ferroelectric properties and a pyrochlore phase having paraelectric properties, the pyrochlore phase being disposed on interfaces between the dielectric layers and the first and second electrode layers in lower portions of the dielectric layers with respect to the substrate.

2. The thin-film ceramic capacitor of claim 1, wherein the pyrochlore phase has a triangular pyramid shape.

3. The thin-film ceramic capacitor of claim 1, wherein in a single dielectric layer, a volume fraction of the perovskite phase having the ferroelectric properties, based on an overall volume of the single dielectric layer, is 50 to 97 vol %.

4. The thin-film ceramic capacitor of claim 1, wherein the perovskite phase having the ferroelectric properties has a structure in which the perovskite phase is doped with niobium (Nb).

5. The thin-film ceramic capacitor of claim 1, wherein the pyrochlore phase is $RE_2Ti_2O_7$, where RE is a rare earth element.

6. The thin-film ceramic capacitor of claim 1, wherein a temperature coefficient of capacitance (TCC) of the mixed phase of the perovskite phase having the ferroelectric properties and the pyrochlore phase having the paraelectric properties is within 20% from a temperature range from −55° C. to 125° C.

7. The thin-film ceramic capacitor of claim 1, wherein among the plurality of vias, a first via connects the first electrode layer and the first electrode pad to each other and penetrates from one surface of the body to a lowermost first electrode layer adjacent to the substrate.

8. The thin-film ceramic capacitor of claim 1, wherein among the plurality of vias, a second via connects the second electrode layer and the second electrode pad to each other and penetrates from one surface of the body to a lowermost second electrode layer adjacent to the substrate.

9. The thin-film ceramic capacitor of claim 1, wherein the first via is connected to substantially all of the first electrode layers disposed in the body.

10. The thin-film ceramic capacitor of claim 1, wherein the second via is connected to substantially all of the second electrode layers disposed in the body.

11. The thin-film ceramic capacitor of claim 1, wherein an insulating layer is disposed on a second electrode layer exposed in the first via and a first electrode layer exposed in the second via.

12. The thin-film ceramic capacitor of claim 1, wherein in the plurality of vias, a width of each step is increased in a direction from the substrate to an upper portion of the body.

* * * * *